No. 702,597. Patented June 17, 1902.
W. C. SALMON.
STEAM COOKING APPARATUS.
(Application filed July 19, 1901.)
(No Model.)
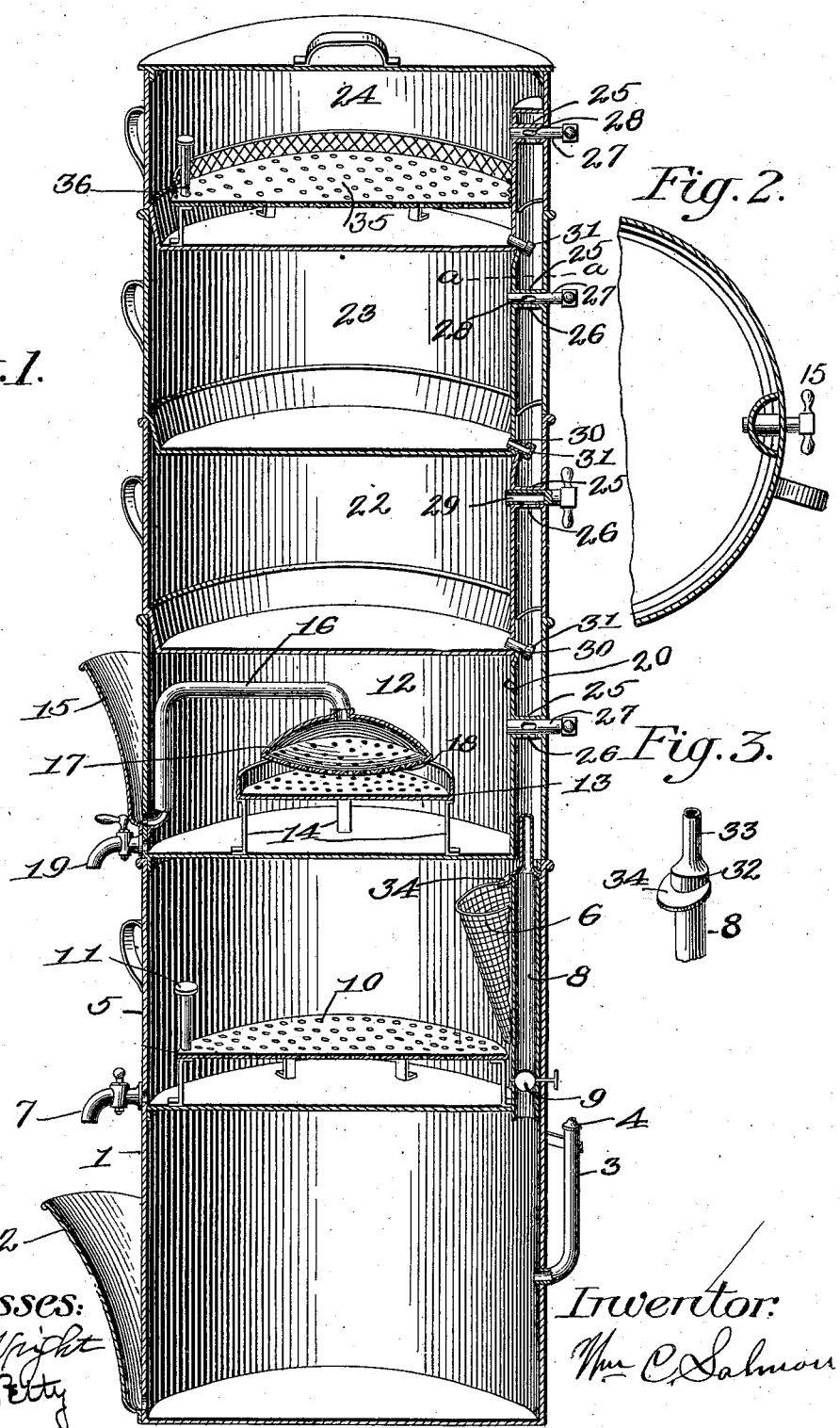

UNITED STATES PATENT OFFICE.

WILLIAM C. SALMON, OF WASHINGTON, DISTRICT OF COLUMBIA.

STEAM COOKING APPARATUS.

SPECIFICATION forming part of Letters Patent No. 702,597, dated June 17, 1902.

Application filed July 19, 1901. Serial No. 68,928. (No model.)

*To all whom it may concern:*

Be it known that I, WILLIAM C. SALMON, a citizen of the United States, residing at the city of Washington, District of Columbia, have invented new and useful Improvements in Steam Cooking Apparatus, of which the following is a specification.

My present invention relates to certain new and useful improvements in steam cooking apparatus of the type illustrated in my Letters Patent No. 357,240, dated July 26, 1887; No. 429,099, dated May 27, 1890, and No. 566,228, dated August 18, 1896, and has for its object to improve and simplify the construction and arrangement of such devices and provide means whereby all kinds of foods may be thoroughly and properly cooked with the aid of steam at the expenditure of little heat; and to these ends my invention consists in the various features of construction, arrangement, and coöperation of parts, substantially such as hereinafter more particularly pointed out, and defined in the claims.

In describing the invention in detail reference is had to the accompanying drawings, forming a part of this specification, wherein like numerals of reference indicate corresponding parts throughout the several views, in which—

Figure 1 is a vertical sectional view of my improved cooking apparatus. Fig. 2 is a horizontal section taken on the line $a\ a$ of Fig. 1, and Fig. 3 is a detail perspective view of one of the parts of the apparatus.

The fact that food cooked by steam is more palatable, easier to digest, and more nourishing than food cooked in other ways is becoming recognized, and it is one of the objects of my invention to provide a simple, convenient, and practical sectional steam cooking apparatus whereby the operation of cooking various articles of food at the same time may be carried out, as well as preventing the food from becoming "soggy," the latter being a serious objection heretofore existing in various devices of this character and which is overcome by drawing off the condensation from the various food-cooking sections.

A further object of the invention lies in the employment of means through which passes the condensation from the various food-cooking sections to form a soup in the lower one of said sections.

A still further object of the invention is to provide means whereby the liquid of condensation of any one or more of the sections may be cut off and prevented from entering the soup-compartment.

Another object of the invention is to provide means for varying and regulating the amount of steam entering the various food-cooking sections.

A still further object of the invention is to provide a steam cut-off to prevent the escape of steam from the boiler during handling of the various sections.

The invention also comprises means for directing the liquid of condensation into a flavoring-receptacle and preventing said liquid from entering the boiler.

Further objects will appear from a reading of the following detailed description of the apparatus.

In the drawings referred to I have illustrated the preferred embodiment of my invention, in which the cooking apparatus comprises a lower section, forming the steam generator or boiler 1, preferably of cylindrical form and provided with an open gage cup or pocket 2, which projects from the vertical wall of the boiler and communicates with its interior to enable its contents to be replenished and to indicate to the operator the quantity of water therein. The boiler is also provided with an upwardly-extending pipe 3, carrying a steam-whistle 4 at its upper end, which serves as an alarm to indicate to the operator when the water in the boiler reaches too low a level for proper service.

Mounted upon the boiler 1 is the lower food-cooking compartment 5, which is employed for the boiling of soup and is provided with a foraminous receptacle 6. The receptacle is detachably secured to the inner face of the vertical wall of the section 5 and is adapted to contain a suitable flavoring extract, which will be hereinafter referred to.

The numeral 7 denotes a cock or faucet arranged to deliver the soup from the section 5, and the numeral 8 indicates a section of the steam feed-pipe, which is located wholly within the compartment 5 and communicates at its lower end with the boiler 1. The section 8 of the steam-pipe is provided with a cut-off or damper 9, so arranged that the said steam-pipe may be closed when the various sections of the cooker are being assembled or disconnected, thus preventing the escape of live steam at such times, which escaping steam would very likely result in burning or scalding the hands or arms of the operator during a handling of the sections. I consider this cut-off or damper, as well as the flavoring-receptacle, as constituting important and valuable features of my invention.

Arranged within the soup-compartment 5 is a removable perforated tray or false bottom 10, supported on suitable legs and having a lifting handle or handles 11, as shown, whereby the tray may be easily and quickly removed from the compartment for cleaning and removing the contents thereof. By employing the perforated tray in the soup-compartment all particles of the meat and vegetable being cooked will be caught thereby and a clear soup obtained.

Located above the soup-compartment 5 is another cooking-section 12, which is preferably used for the boiling of coffee and is provided with a receptacle 13, having a perforated bottom for filtering and which is supported upon legs 14. The section 12 has secured to the outer face of its vertical wall the cup 15 to receive the water for replenishing the receptacle 13 when needed. The cup 15 has communication with the receptacle 13 by means of a pipe 16, which is provided at its end with an enlarged bulb 17, having a perforated bottom 18, said bulb being disposed directly above the receptacle 13, so that when water is supplied to the cup 15 it will flow through the pipe 16 and discharge into the receptacle 13 containing the coffee, tea, or other substance from which a beverage is to be made. The said section 12 is provided with a draw-off cock or faucet 19 for the coffee or the like, and is also provided on its interior with a steam-pipe section 20, having a reduced upper end.

The reference-numerals 22, 23, and 24 denote a series of superimposed food-cooking sections, each of which has a steam pipe or passage on its inner side similar to the pipe 20, the arrangement of the pipes being such that they will telescope one with the other when the cooking-sections are superimposed to form a continuous steam-conduit leading from the boiler through all the sections. Each of the sections 22, 23, and 24 is also provided with a thimble 25, extending transversely through its steam-pipe, said thimbles each having communication with the steam-pipe through an opening 26, and fitted to turn in each thimble is a hollow plug 27, having a suitable handle by which it may be turned. The plugs communicate with the steam pipe or conduit through lateral ports 28 and with the separate food-cooking sections through openings 29 in the ends of the plugs. It will be seen that the amount of steam entering the several cooking-sections may be regulated and controlled to a nicety by means of the hollow plugs 27.

In order that the condensed steam and juices from the meats and vegetables in the various food-cooking sections may be conveyed to the soup-compartment 5, I provide each of the sections 22, 23, and 24 with a short drain-pipe 30, each of which has a removable screw-cap 31, whereby any one or all of the drain-pipes may be closed at will in case it is desired to exclude the condensed steam or vapors of any particular section from the soup-compartment.

From the construction shown and described it will be seen that the steam from the boiler 1 as well as the liquids of condensation from the food-cooking sections travel in the same pipe or passage, and I therefore dispense with the use of separate pipes for this purpose. In order that the liquids of condensation may be prevented from entering the boiler 1 through the pipe 8, I have provided a special form of cap 32 for said pipe, as will be seen by referring to Fig. 3 of the drawings. This cap 32 fits over the pipe 8 and is provided with a reduced end 33 and an inclined flange 34, said flange being disposed directly over and inclined toward the flavoring-receptacle 6, so that all liquids of condensation will be discharged into said receptacle.

In the drawings, Fig. 1, I have shown the upper food-cooking section 24 as provided with a removable tray or basket 35, which latter has a handle 36 attached thereto whereby the same may be lifted from the section. This section 24, with its tray, is especially adapted for cooking potatoes and other vegetables.

I prefer to use the apparatus in the following manner: The section 5 for soup, section 12 for coffee, section 22 for meats, section 23 for puddings and the like, and section 24 for potatoes and other vegetables. The receptacle 6 in the soup-compartment 5 is adapted to contain a suitable flavoring extract for the soups, so that as the condensed steam passes from the various food-cooking sections through the drain-pipes it will be fed to the receptacle 6, percolating therethrough into the soup, it being understood that the condensed steam will also take up the extract of the various meats and vegetables being cooked in the different sections, assisting materially in forming a rich palatable soup.

What I claim, and desire to secure by Letters Patent, is—

1. In a steam cooking apparatus, the combination with a boiler and a series of food-cooking sections superimposed upon the boiler, a pipe for conveying steam from the boiler to each of said sections, a flavoring-receptacle located in one of said sections, and means for discharging the liquid of condensation from the other sections into said receptacle.

2. In a steam cooking apparatus, the combination with a boiler and a series of food-cooking sections superimposed upon the boiler, a steam-pipe located wholly within each section for conveying steam from the boiler to the several sections, a hollow cap having a reduced upper end located within the pipe of the lower food-cooking section and serving to direct the liquid of condensation from the upper sections into said lower section and preventing said liquid from entering the boiler.

3. In a steam cooking apparatus, the combination with a boiler, and a series of food-cooking sections superimposed upon the boiler, a steam-conduit for conveying steam from the boiler to each of said sections, and means for directing the liquid of condensation from the several sections into the lower food-cooking section and preventing said liquid from entering the boiler.

4. In a steam cooking apparatus, the combination with a boiler and a series of food-cooking sections superimposed upon the boiler, a steam-conduit for conveying steam from the boiler to the several sections, a hollow cap having a reduced upper end fitted upon the end of the steam-pipe in the lower food-section, and an inclined flange on said cap serving to direct the liquid of condensation from the upper sections into said lower food-section.

5. In a steam cooking apparatus, the combination with a boiler and a series of food-cooking sections, superimposed upon the boiler, a steam-conduit for conveying steam from the boiler to the several sections, a foraminous receptacle located in the lower food-section, and means for directing the liquid of condensation from the several upper sections into said receptacle and for preventing said liquid from entering the boiler.

In testimony whereof I affix my signature in presence of two witnesses.

WILLIAM C. SALMON.

Witnesses:
W. E. WRIGHT,
JOHN A. PETTY.